March 27, 1934.  J. L. LITOMY  1,952,323
MACHINE FOR SHARPENING SAW BLADES
Filed March 19, 1932  3 Sheets-Sheet 1
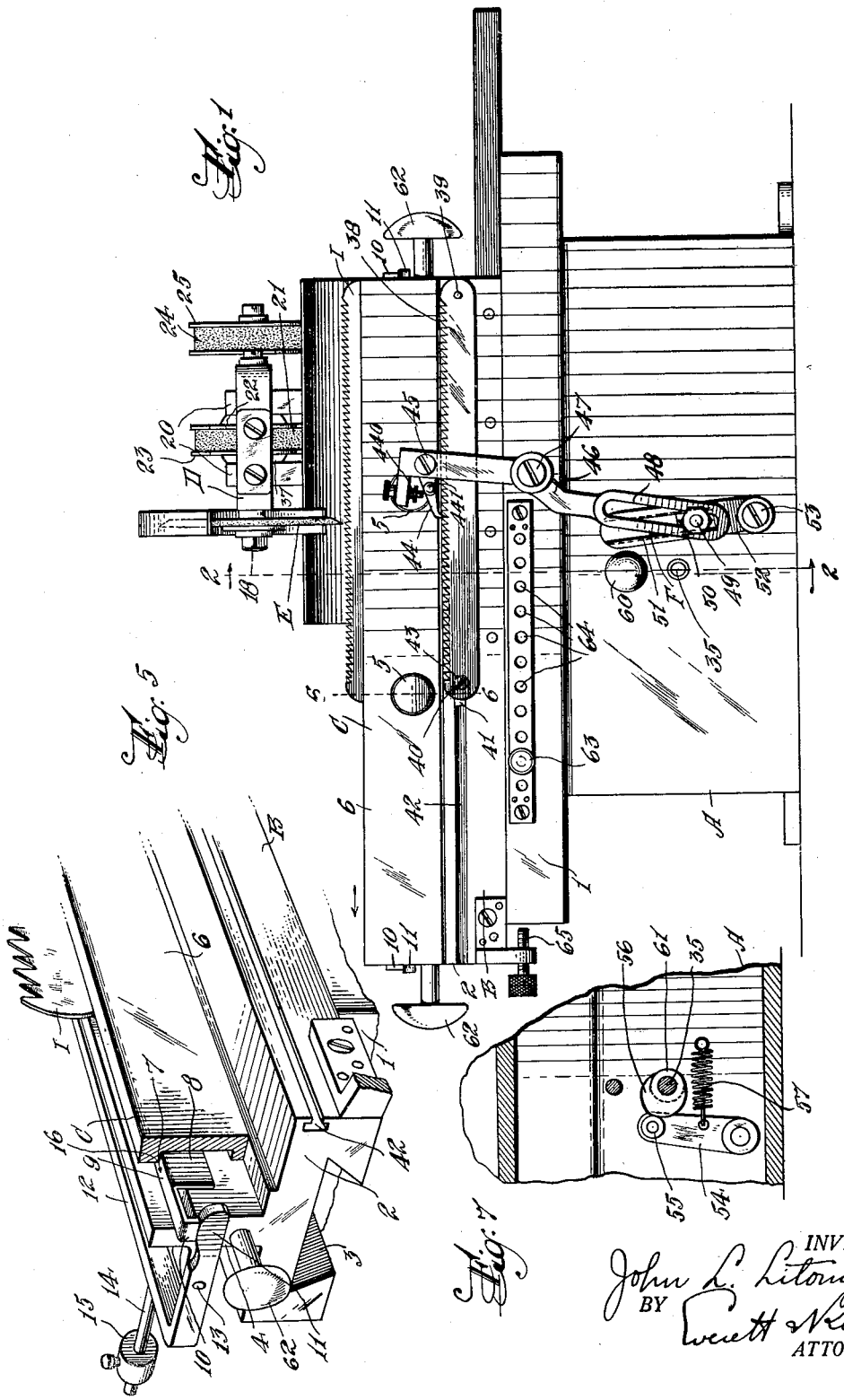

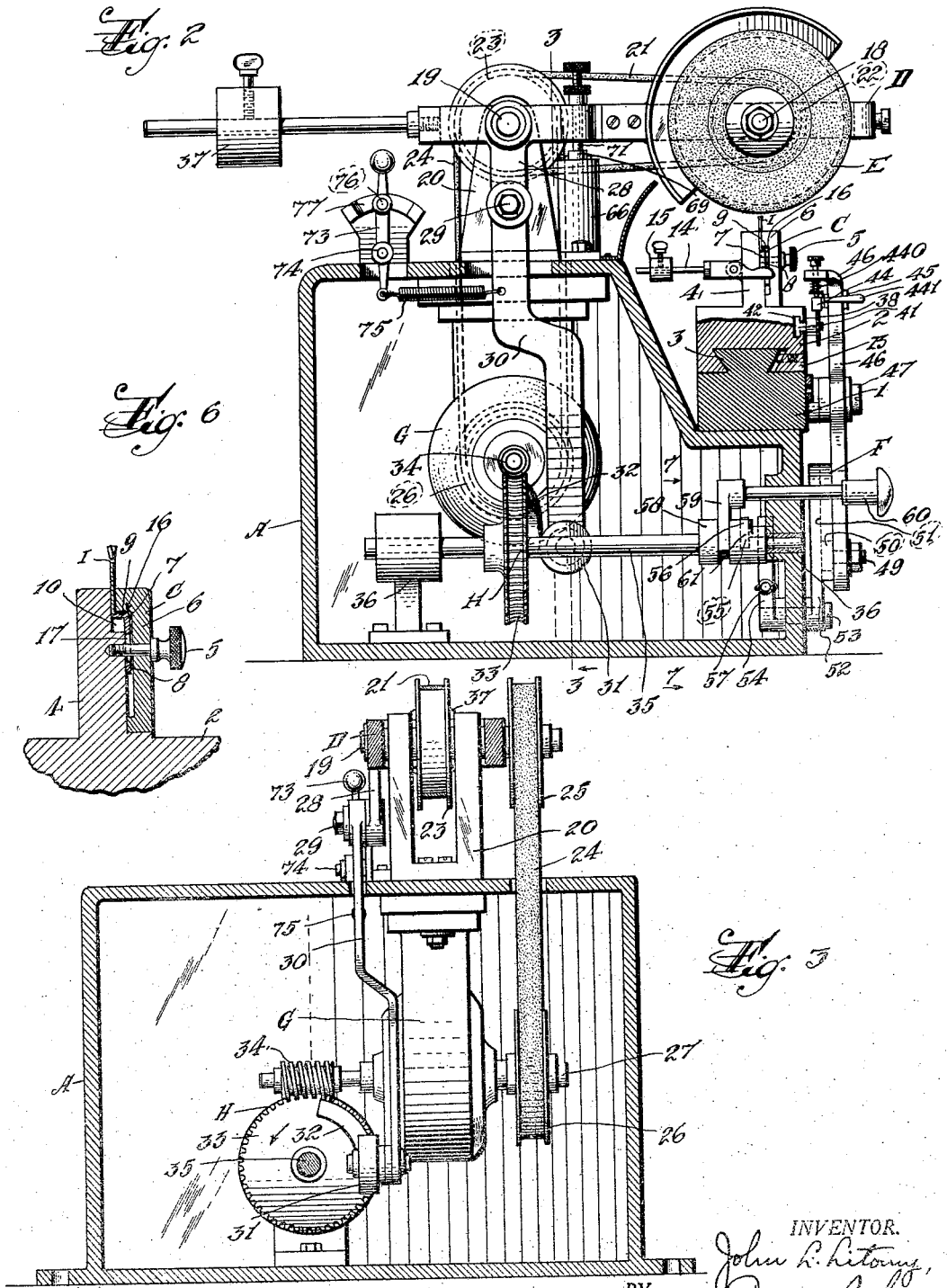

March 27, 1934.  J. L. LITOMY  1,952,323
MACHINE FOR SHARPENING SAW BLADES
Filed March 19, 1932   3 Sheets-Sheet 3
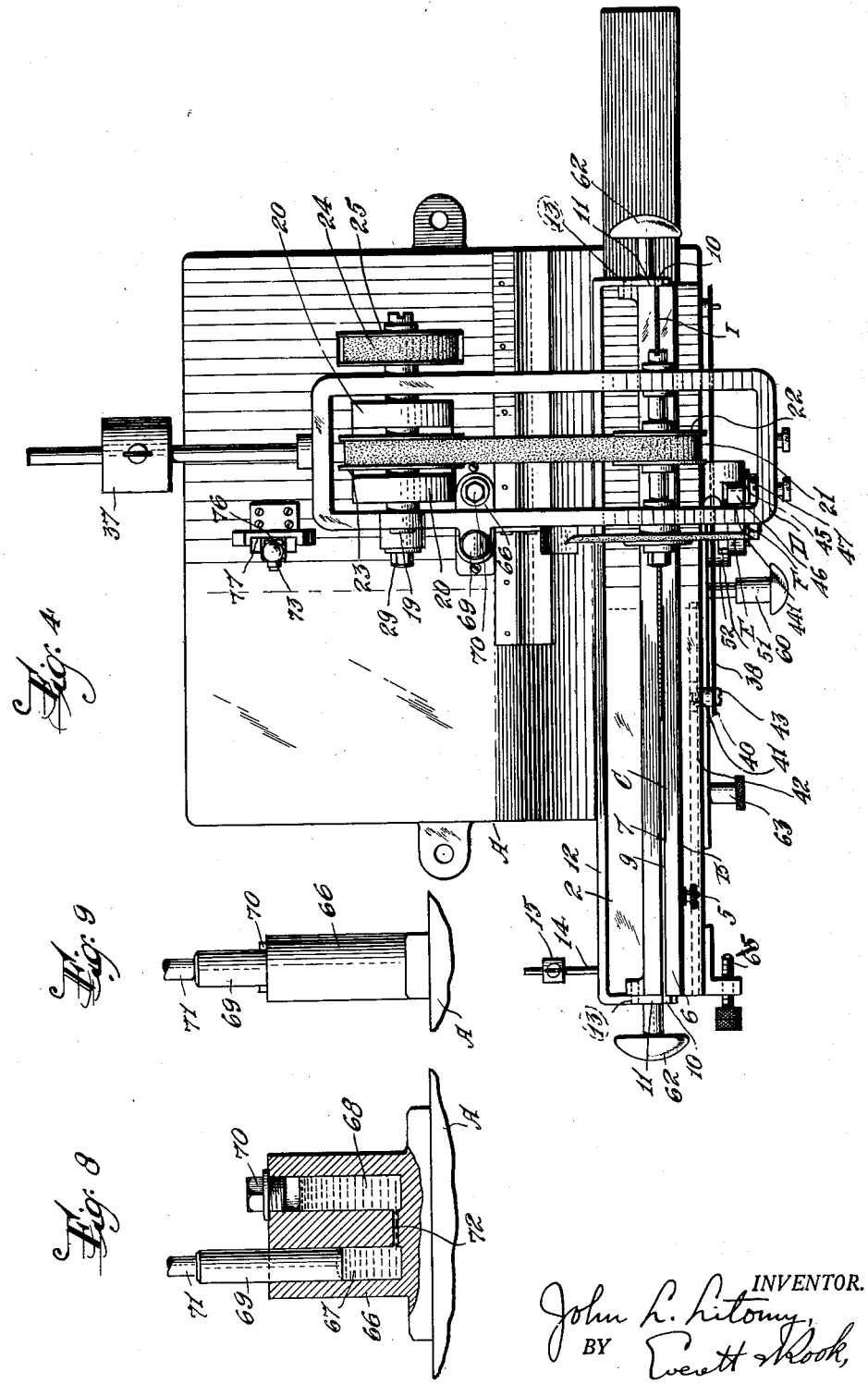
INVENTOR.
John L. Litomy,
BY Everett Hook,
ATTORNEYS.

Patented Mar. 27, 1934

1,952,323

UNITED STATES PATENT OFFICE 1,952,323

MACHINE FOR SHARPENING SAW BLADES

John L. Litomy, Glen Ridge, N. J.

Application March 19, 1932, Serial No. 599,881

22 Claims. (Cl. 76—40)

This invention relates in particular to machines for sharpening metal cutting hack saw blades, although the invention is equally well adapted for use in machines for sharpening other types of saw blades.

It has been the general practice in plants which use hack saw blades to discard or throw away a blade after it has become dull and to replace the discarded blade with an entirely new blade. This has resulted in considerable expense and waste of blades which could have been avoided if satisfactory means had been available for sharpening the dull or worn blades. Furthermore, greater efficiency and speed of cutting can be obtained with a sharpened or ground saw blade than from a new blade. The reason for this is that in the manufacture of metal cutting hack saw blades, the blades are subjected to a hardening process or heat treatment after the teeth have been cut and set, which forms a scale that dulls the edges of the teeth; the sharpening or grinding of the teeth removes this scale and produces fine, clean cutting edges on the teeth.

Before my invention was made, however, the sharpening of metal cutting hack saw blades was an especially perplexing problem. The heat treatment of the blades during manufacture frequently causes warping of the blade so that the teeth are out of line, i. e., the cutting edge of the blade is curved longitudinally in the plane of the blade. So far as I know, no satisfactory saw blade sharpening mechanism has been provided to compensate for this irregularity in the teeth so as to uniformly grind all of the teeth. Furthermore, the heat treatment sometimes causes the teeth to become non-uniformly spaced; and frequently in use of the blades some teeth are broken off. This condition has made it practically impossible to properly relatively move the blade and the grinding wheel so as to compensate for the irregular spacing of the teeth and permit uniform grinding of all of the teeth. Accordingly, it has been a difficult problem to provide a machine which shall grind all teeth to the same extent, and which shall not grind some teeth too much or so rapidly as to burn them, and fail to grind other teeth at all or insufficiently.

The primary object of my invention is to provide a novel and improved machine for sharpening saw blades which shall overcome all of the above-mentioned difficulties and which shall be capable of sharpening or grinding the teeth of saw blades uniformly and rapidly even when cutting edges of the blades are warped and/or the teeth are unevenly or non-uniformly spaced.

Another object is to provide a machine of this character embodying novel and improved means for supporting a saw blade in operative relation to a grinding wheel or the like to compensate for warping of the cutting edge of the blade in the plane of the blade so that all of the teeth shall be uniformly ground.

Further objects are to provide in a machine of the character described a grinding wheel mounted to move toward and from a saw blade, and novel and improved means for yieldably holding a saw blade in operative relation to said grinding wheel whereby a uniform predetermined pressure of the grinding wheel on the blade shall be insured; to provide such a mounting means wherein the blade shall be movable with said grinding wheel and have prolonged contact therewith under uniform pressure as the wheel moves into contact with the blade; and to provide a holding means for saw blades wherein the blades shall be free to move longitudinally to adjust themselves to the grinding wheel.

Another object is to provide in such a machine novel and improved means for actuating and controlling the movement of said grinding wheel into grinding contact with a saw blade to ensure adequate and prevent excessive grinding of the teeth.

A further object is to provide such a machine including novel and improved means for regulating the pressure of contact between the grinding wheel and the saw blade.

Other objects are to provide a machine of the character described having novel and improved means for moving or feeding a saw blade relatively to the grinding wheel; to provide in such a machine a novel and improved clutch mechanism for controlling said feeding means; and to obtain other advantages and results as will be brought out by the following description.

Referring to the accompanying drawings, in which corresponding and like parts are designated throughout the several views by the same reference characters, Figure 1 is a front elevation of a saw blade sharpening machine embodying my invention;

Figure 2 is a transverse vertical sectional view, on the line 2—2 of Figure 1;

Figure 3 is a longitudinal vertical sectional view, on the line 3—3 of Figure 2;

Figure 4 is a top plan view of the machine;

Figure 5 is a fragmentary sectional view of one end of the feed table and the blade-holding means;

Figure 6 is an enlarged transverse vertical sectional view through the saw-holding means, on the line 6—6 of Figure 1;

Figure 7 is a fragmentary vertical longitudinal sectional view, on the line 7—7 of Figure 2;

Figure 8 is an enlarged sectional view through the hydraulic resistor for the oscillating supporting frame for the grinding wheel, and Figure 9 is an end elevation thereof.

Specifically describing the illustrated embodiment of the invention, the machine comprises a support casing A which may be mounted on a table, stand or other suitable pedestal. On the top and at the front of the casing A is mounted a feed table B upon which is arranged a blade-holding mechanism C. On the top of the casing A is mounted an oscillating frame D which carries a grinding wheel E that is disposed above the saw-holding mechanism C. The feed table B is actuated in one direction to move the saw blade beneath the grinding wheel, by actuating mechanism generally designated F which is driven from an electric motor G. The oscillating frame D is also actuated by the motor G through gearing H.

More specifically, the feed table B comprises a bed 1 upon which is slidable a carriage 2 which is connected to the bed by the usual dove-tail rib and groove connection 3. The saw-holding means C is arranged on the top of the carriage 2 and includes a vertical web 4 which extends longitudinally of the carriage 2, and to which is separably connected by thumb screws 5, a plate 6 between which and the web 4 a saw rest 7 is arranged.

This saw rest 7 comprises a metal strip having a vertical body portion 8 and a horizontal flange 9 upon which a saw blade I may loosely rest, as clearly shown in Figures 5 and 6. The saw blade is placed upon the flange 9 through a slot provided between the top of the web 4 and the top of the plate 6. The ends of the saw rest 7 project beyond the web 4 and have downturned flanges 10 which rest upon the ends of the arms 11 of a U-shaped balance yoke 12. Each of the arms 11 is pivotally mounted at 13 on one end of the web 4 at the rear side thereof, and the base of the yoke has a laterally projecting arm 14 upon which is adjustably mounted a counterweight 15. The counterweight 15 and the yoke 12 normally influence the saw rest 7 upwardly into engagement with a stop shoulder 16 on the plate 6, and endwise movement of the saw rest is limited by the screws 5 which pass through slots 17 in the body portion 8 of the saw rest. With this construction, it will be observed that when pressure is exerted on a saw blade which is supported on the rest 7, sufficient to overcome the counterweight 15, the rest 7 may move downwardly and permit the saw blade to follow it. The counterweight 15 may be adjusted to compensate different weights of saw blades of different sizes.

The grinding wheel E is mounted on a shaft 18 which is journaled in the oscillating frame D above and with its axis substantially parallel with the saw blade rest 7, and the oscillating frame D is pivoted at 19 on a bracket 20 secured upon the top of the casing A. The grinding wheel E is driven by a belt 21 passing over pulleys 22 and 23 on the respective shafts 18 and 19, the latter of which is driven by a belt 24 passing over a pulley 25 on the shaft 19 and a pulley 26 on the shaft 27 of the electric motor G which is suspended from the underside of the top wall of the casing A. The grinding wheel E is moved into and out of contact with a saw blade mounted in the holding means C by oscillation of the frame D. This frame D has an arm 28 to which is bolted at 29, an extension 30 at one end of which is a follower roller 31 which cooperates with a cam 32 on the face of a worm wheel 33 which meshes with a worm 34 on the motor shaft 27. The worm wheel 33 is mounted on a countershaft 35 journaled in bearings 36 adjacent the bottom of the casing A. Preferably the frame D has a counterweight 37 at the side of the pivot 19 opposite the grinding wheel E.

In accordance with the invention, the grinding wheel E descends into contact with a saw blade as each tooth is brought into proper relation to meet the grinding wheel by movement of the carriage 2. The actuating means for the carriage includes a master saw blade 38 the teeth of which serve in the nature of a ratchet, the size of the master blade and spacing of the teeth thereof corresponding to the size and tooth spacing of the blade which is to be sharpened. This master blade is removably mounted on the carriage by a fixed stud 39 to enter the usual opening in one end of the blade, and a connecting device 40 to similarly cooperate with the other end of the blade. The connecting device 40 may consist of a block 41 slidable in an undercut groove 42 in the side of the carriage and having threaded therein a screw 43 which also passes through the opening in one end of the blade 38. Obviously, the adjustable device 40 may be slid longitudinally of the carriage to accommodate saw blades of different lengths, and the screw 43 may serve both to clamp the block 41 in the groove 42 and secure the saw to the block. A pawl 44 cooperates with the teeth of the master blade 38 and is pivotally mounted at 45 on the upper end of an actuating lever 46 which is pivotally mounted intermediate its ends at 47 on the bed 1. The pawl 44 is influenced into engagement with the teeth of the blade by a spring actuated plunger 440. The other end of the actuating lever 46 has a slot 48 through which extends a bolt 49 mounted on a block 50 slidable longitudinally in an undercut groove 51 in a crank arm 52 which is mounted on a stub shaft 53 journaled in the front wall of the casing. On the inside of the casing A, an arm 54 is secured upon the stub shaft 53 and carries a roller 55 to cooperate with a driving cam 56 splined on the countershaft 35. The roller 55 is normally influenced into contact with the cam 56 by a tension spring 57. Engagement of the cam 56 with the roller 55 is controlled by a clutch mechanism which includes a sleeve 58 slidable on the countershaft 35 and of which the cam 56 forms a part. This sleeve 58 has a circumferential groove in which is arranged a fork 59 to which is connected an operating rod 60 which is slidable in and projects from the front wall of the casing A. With this construction, it will be observed that when the sleeve 58 is slid on the countershaft 35 toward the front of the casing A, as shown in Figure 2 of the drawings, the cam 56 will be brought into juxtaposition to the roller 55, so that rotation of the cam will oscillate the arm 54; while when the sleeve 58 is slid in the other direction, the cam 56 will be moved away from the roller so that the roller will ride upon a dwell 61 which is concentric with the shaft 35. While the roller 55 is in engagement with the cam 56, the actuating lever 46 will be oscillated so as to move the pawl 44 over the teeth of the master blade and actuate the carriage 2 step by step in the direction of the arrow on Figure 1. The adjustable connection 49, 50 between the lever 46 and the crank arm 52 is for the purpose of adjusting the stroke of the pawl 44 to correspond to the different sizes and spacing of teeth on the master blade.

Therefore, it will be understood that during operation of the actuating mechanism and the carriage 2, the blade I being sharpened will be moved one tooth at a time beneath the grinding wheel E and this movement will take place even though some teeth may be missing from the blade I being sharpened. To move the carriage backwardly, it is merely necessary to lift the pawl 44 from the saw blade by raising the handle 441, and then manually push the carriage in a direction opposite to that shown by the arrow on Figure 1. If desired, push knobs 62 may be mounted at the ends of the carriage.

For initially locating the carriage in the proper starting position and to avoid special care and adjustment at the beginning of the sharpening of each blade, I may provide a stop means in the form of a stud 63 adapted to be placed in any of a plurality of openings 64 spaced longitudinally of the bed 1 and to be engaged by a set screw 65 on the end of the carriage. Obviously, as the carriage is pushed to the right in Figure 1, the screw 65 will engage the stop stud 63 to limit movement of the carriage in that direction.

The operation of the machine as so far described will be generally understood from the foregoing. A master blade corresponding to the blade to be sharpened is first mounted on the carriage, after which the blade to be sharpened is placed on the rest 7 with its ends coincident with the ends of the master blade, the carriage being pushed to its limit to the right of Figure 1. The stop stud 63 and screw 65 may then be adjusted. Thereupon the motor 6 is started in operation so that the grinding wheel and worm wheel 33 are rotated. The oscillating frame D is permitted to move downwardly by gravity into contact with the saw blade as the cam 32 moves from beneath the roller 31, and as the grinding wheel descends, it presses upon the blade which is permitted to recede or move with the wheel by downward movement of the rest 7 against the influence of gravity on the counterweight 15 which tends to hold the blade in contact with the wheel. This action ensures a slow and prolonged yielding contact between the grinding wheel and the saw blade, which is uniform throughout the period of contact between the wheel and the blade, so that adequate grinding of the tooth is ensured and excessive grinding is prevented. This is particularly important where the blade is warped longitudinally in its own plane and the teeth at different portions of the blade are different distances from the grinding wheel in its normal position. While the stroke of the grinding wheel is uniform, the movement of the blade may vary according to the position of the teeth. The counterweight 15 may be adjusted to vary the degree of pressure. Should the tooth being ground be slightly out of place, the blade is free to move longitudinally under the influence of the pressure of the grinding wheel thereon so that the blade may accommodate itself to the wheel.

The rod 60 is now pulled outwardly to cause engagement of the cam 56 with the roller 55. The cams 32 and 56 are so related that the carriage is stationary during the contact of the grinding wheel with the saw blade, and the carriage is moved forwardly one tooth as the wheel recedes from the blade. This operation continues until the end of the blade is reached, and it will be observed that even if the machine is not stopped when the end of the blade is reached, no damage can occur, since the feed of the table will be stopped by the pawl 44 riding over the end of the master blade, and the sharpened blade will have been moved from beneath the grinding wheel.

Preferably means is provided for causing a gradual or slow movement of the grinding wheel toward the blade. This means may comprise a hydraulic check which consists of a casing 66 having two cylindrical chambers 67 and 68 with oil or other liquid therein. In the end of one of the chambers is a piston 69, while the corresponding end of the other chamber is closed by a plug 70. An adjustable screw 71 on the oscillating frame D contacts with the end of the piston 69. The two chambers 67 and 68 communicate through a restricted passage 72, so that as the oscillating frame D is released by the cam 32 to permit descent of the grinding wheel, such descent is retarded by the slow flow of fluid from the chamber 67 to the chamber 68. This ensures a longer and more gradual contact of the grinding wheel with the saw blade than could be obtained solely by mechanical cam action.

It is also desirable to provide means for sensitive adjustment of the pressure of the grinding wheel on the saw blade to supplement the gravitational movement of the frame E, and such means may comprise a lever 73 pivoted intermediate its ends on the top of the casing A at 74 and connected at one end to a tension spring 75, the other end of which is connected to the extension 30 of the arm 28 on the oscillating frame. A suitable detent may be provided for holding the lever 73 in adjusted position, for example a spring pressed plunger 76 in the lever 73 which frictionally engages a segmental fixed surface 77. Obviously, by oscillating the lever 73 the tension of the spring may be varied, which in turn will vary the pressure of the grinding wheel E upon the saw blade. By suitable adjustments of both this lever 73 and the counterweight 15, the degree of pressure of the grinding wheel on the blade may be widely and sensitively varied.

To compensate for different sizes of grinding wheels or different widths of saw blades, preferably the extension 30 is angularly adjustable with respect to the arm 28 of the oscillating frame D through the bolt connection 29. Obviously by rotating the extension 30 on the bolt 29, the normal or rest position of the grinding wheel E with respect to the saw blade may be varied up or down.

While I have shown and described my invention as embodied in certain details of construction, it should be understood that this is primarily for the purpose of illustrating the principles of the invention and that many modifications and changes may be made in the details of construction without departing from the spirit or scope of the invention.

Having thus described the invention, what I claim is:

1. A machine of the character described, comprising means for holding a saw blade including a pair of spaced and parallel vertical members, a saw blade rest vertically movable between said members to support a saw blade, a U-shaped yoke having each of its arms pivoted intermediate its ends on one of said members, the ends of said saw blade rest being supported on the corresponding ends of said arms of said yoke, a counterweight for said rest mounted on said yoke, a grinding wheel, means for rotating said wheel, and means permitting bodily movement of the grinding wheel in its own plane into grinding contact with said saw blade, whereby said saw blade may yield under pressure from said grinding wheel.

2. A machine of the character described, comprising means for holding a saw blade, an oscillating frame, a grinding wheel journaled thereon so as to be moved into and out of contact with said blade upon oscillation of said frame, said frame being movable by gravity in the direction to cause contact of said wheel with said blade, means for yieldingly retarding movement of said frame under gravitational influence, means for moving said frame in the opposite direction, said means for holding a saw blade including a rest for the saw blade movable under pressure exerted by the grinding wheel on said blade, means operated by gravity to yieldingly resist such movement of said rest, and adjustable means to supplement said gravitational movement of said oscillating frame.

3. A machine of the character described, comprising means for holding a saw blade, an oscillating frame, a grinding wheel journaled thereon so as to be moved into and out of contact with said blade upon oscillation of said frame, said frame being movable by gravity in the direction to cause contact of said wheel with said blade, means for yieldingly retarding movement of said frame under gravitational influence, means for moving said frame in the opposite direction, said means for holding a saw blade including a rest for the saw blade yieldable under pressure exerted by said grinding wheel on said blade, and adjustable means to supplement said gravitational movement of said oscillating frame.

4. A machine of the character described, comprising a bed, a carriage movable thereon, means for holding a saw blade including a pair of spaced and parallel vertical members on said carriage to receive a blade between them, a rest for said blade vertically movable between said members, a U-shaped yoke having each of its arms pivoted intermediate its ends on one end of one of said members, said arms supporting at corresponding ends thereof the ends of said rest, a counterweight for said rest mounted on said yoke, means for moving said carriage in steps equal to the distance between the teeth of said blade, a grinding wheel mounted for bodily movement by action of gravity into contact with said blade, means for bodily moving said wheel out of contact with said blade, and means for rotating said grinding wheel.

5. A machine of the character described, comprising a bed, a carriage movable thereon, means for holding a saw blade including a pair of spaced and parallel vertical members on said carriage to receive a blade between them, a rest for said blade vertically movable between said members, a U-shaped yoke having each of its arms pivoted intermediate its ends on one end of one of said members, said arms supporting at corresponding ends thereof the ends of said rest, a counterweight for said rest mounted on said yoke, means for moving said carriage in steps equal to the distance between the teeth of said blade, a grinding wheel, an oscillating frame for said wheel to permit movement of the wheel into and out of contact with said blade, said frame being movable by action of gravity in the direction to cause contact of said wheel with said blade, means for retarding gravitational movement of said frame, means for moving said frame in the opposite direction, and means for rotating said grinding wheel.

6. A machine of the character described, comprising a vertically movable support for a saw blade, a grinding wheel, means permitting bodily movement of the grinding wheel in its own plane into contact with said saw blade, gravity operated means for resisting downward movement of said support but yieldable under pressure from said grinding wheel as the latter moves into contact with said blade, and means for rotating said grinding wheel, so that said blade may bodily move with said grinding wheel in grinding contact therewith and against the resistance of said gravity operated means during bodily movement of the grinding wheel.

7. In a machine of the character described, means for holding a saw blade for movement in its own plane, gravity operated means for yieldingly resisting such movement of the blade in one direction and causing such movement in the opposite direction, and a grinding wheel mounted for movement into and out of grinding contact with a blade in said holding means, whereby said blade will move with said grinding wheel while the latter is in contact with said blade and the blade is yieldingly held in contact with said grinding wheel during the grinding operation.

8. In a machine of the character described, means for holding a saw blade for movement in its own plane, gravity operated means for yieldingly resisting such movement of the blade in one direction and causing such movement in the opposite direction, and a grinding wheel mounted for movement by gravity into grinding contact with a blade in said holding means, and means for moving said grinding wheel out of contact with said blade, whereby said blade will move with said grinding wheel while the latter is in contact with said blade and the blade is yieldingly held in contact with said grinding wheel during the grinding operation.

9. The machine set forth in claim 8 wherein said gravity operated means for the saw blade is adjustable to vary the force exerted thereby on the saw blade, and with the addition of adjustable means for supplementing and varying the pressure exerted by said grinding wheel upon said saw blade.

10. The machine set forth in claim 8 with the addition of a hydraulic check for yieldingly retarding gravitational movement of said grinding wheel in contact with said blade.

11. A machine of the character described comprising a grinding wheel mounted for movement in its own plane, and gravity operated means for permitting relative movement of a saw blade and said grinding wheel into grinding contact with each other under influence of gravity, and gravity operated means permitting movement of said wheel and said blade together in grinding contact with one thereof constantly yieldable relative to the other under influence of the latter and against the action of gravity which influences said wheel and blade into contact with each other.

12. A machine of the character described, comprising a vertically movable support for a saw blade, gravity operated means for yieldingly resisting downward movement of said support, a grinding wheel, means for rotating said wheel, and means for permitting bodily movement of the grinding wheel in its own plane into grinding contact with said saw blade, whereby said saw blade may constantly bodily move with and in grinding contact with said wheel under pressure from the latter and against the resistance of said gravity operated means.

13. The machine set forth in claim 2, wherein said means for yieldingly retarding movement of said frame under gravitational influence is a hydraulic check.

14. A machine of the character described comprising a grinding wheel mounted for movement in its own plane, means permitting relative movement of a saw blade and said grinding wheel into grinding contact, and including gravity operated means permitting movement of said wheel and said blade together in grinding contact with one thereof constantly yieldable relative to the other under influence of the latter and against the influence of gravity on said gravity operated means.

15. A machine of the character described comprising a grinding wheel mounted for movement in its own plane, means permitting movement of said grinding wheel in its own plane into grinding contact with a saw blade, and a gravity operated support for a saw blade permitting said blade and wheel to move together in grinding contact under influence of the wheel and against the influence of gravity on said gravity operated support.

16. A machine of the character described comprising a grinding wheel and a support for a saw blade, and means for permitting said grinding wheel and said support to relatively move to bring said wheel and blade into grinding contact, and means permitting them to move together in grinding contact with one thereof constantly yieldable relative to the other under the influence of the latter.

17. A machine of the character described, comprising means for holding a saw blade, an oscillating frame, a grinding wheel journaled thereon so as to be moved into and out of contact with said blade upon oscillation of said frame, means for permitting movement of said frame into grinding contact with said saw blade under action of gravity, and hydraulic means for yieldingly retarding movement of said frame in the direction to move said grinding wheel into contact with said blade, said means for holding a saw blade including a rest for the saw blade, and yieldable supporting means for said rest permitting yielding of the rest under pressure exerted by said grinding wheel on said blade so that said blade may bodily move with said grinding wheel in grinding contact therewith during bodily movement of the grinding wheel.

18. A machine of the character described, comprising means for holding a saw blade, an oscillating frame, a grinding wheel journaled thereon so as to be moved into and out of contact with said blade upon oscillation of said frame, said frame being movable by gravity in the direction to cause contact of said wheel with said blade, hydraulic means for yieldingly retarding movement of said frame under gravitational influence, and means for moving said frame in the opposite direction, said means for holding a saw blade including a rest for the saw blade, and yieldable supporting means for said rest permitting yielding of the rest under pressure exerted by said grinding wheel on said blade so that said blade may bodily move with said grinding wheel in grinding contact therewith during bodily movement of the grinding wheel.

19. A machine of the character described, comprising means for holding a saw blade, an oscillating frame, a grinding wheel journaled thereon so as to be moved into and out of contact with said blade upon oscillation of said frame, means for permitting movement of said frame into grinding contact with said saw blade under action of gravity, and hydraulic means for yieldingly retarding movement of said frame in the direction to move said grinding wheel into contact with said blade, said means for holding a saw blade including a rest for the saw blade, and means mounting said rest for movement under pressure exerted by the grinding wheel on said blade, including means operated by gravity to yieldingly resist such movement of said rest so that said blade may bodily move with said grinding wheel in grinding contact therewith during bodily movement of the grinding wheel.

20. A machine of the character described, comprising means for holding a saw blade, an oscillating frame, a grinding wheel journaled thereon so as to be moved into and out of contact with said blade upon oscillation of said frame, said frame being movable by gravity in the direction to cause contact of said wheel with said blade, hydraulic means for yieldingly retarding movement of said frame under gravitational influence, and means for moving said frame in the opposite direction, said means for holding a saw blade including a rest for the saw blade and means mounting said rest for movement under pressure exerted by the grinding wheel on said blade, including means operated by gravity to yieldingly resist such movement of said rest so that said blade may bodily move with said grinding wheel in grinding contact therewith during bodily movement of the grinding wheel.

21. The machine set forth in claim 19 with the addition of adjustable means to supplement said gravitational movement of said oscillating frame.

22. The machine set forth in claim 16 with the addition of means for holding a saw blade for free longitudinal endwise movement in its own plane relative to said holding means whereby said blade may move endwise under influence of said grinding wheel on the teeth of the blade to enable said blade to adjust itself and bring a tooth of the blade into proper relation to the grinding wheel.

JOHN L. LITOMY.